(12) United States Patent
Mori

(10) Patent No.: US 9,990,572 B2
(45) Date of Patent: *Jun. 5, 2018

(54) INFORMATION PROCESSING APPARATUS, PRINT DATA GENERATION METHOD, AND STORAGE MEDIUM

(71) Applicant: CANON KABUSHIKI KAISHA, Tokyo (JP)

(72) Inventor: Namihiro Mori, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/654,121

(22) Filed: Jul. 19, 2017

(65) Prior Publication Data

US 2017/0316290 A1    Nov. 2, 2017

Related U.S. Application Data

(63) Continuation of application No. 15/295,416, filed on Oct. 17, 2016, now Pat. No. 9,754,197.

(30) Foreign Application Priority Data

Oct. 26, 2015   (JP) ................................. 2015-209846

(51) Int. Cl.
*G06K 15/02* (2006.01)
*G06F 3/12* (2006.01)

(52) U.S. Cl.
CPC ....... *G06K 15/1835* (2013.01); *G06F 3/1225* (2013.01); *G06F 3/1247* (2013.01);
(Continued)

(58) Field of Classification Search
USPC ........................................................ 358/1.18
See application file for complete search history.

(56) References Cited

U.S. PATENT DOCUMENTS 8,233,162 B2    7/2012  Tayama
2008/0186516 A1*  8/2008  Tayama ............... H04N 1/2307
                                                358/1.2

(Continued)

FOREIGN PATENT DOCUMENTS

JP    2008-276745    11/2008

*Primary Examiner* — Ngon Nguyen
(74) *Attorney, Agent, or Firm* — Fitzpatrick, Cella, Harper & Scinto

(57) ABSTRACT

To prevent the occurrence of a difference in printing results depending on a printer driver to be used despite that the drawing command originates from a GDI application and is the same. An information processing apparatus including a printer driver configured to generate print data compatible with a printing apparatus from input XPS format drawing data, and in the case where the input XPS format drawing data is XPS format drawing data converted by a conversion module from GDI format drawing data that is generated based on print processing of a GDI application and the XPS format drawing data includes a graphics drawing command specifying an object width of 0, the printer driver changes the graphics drawing command into a graphics drawing command specifying drawing with the minimum object width that can be represented by the printing apparatus and generates the print data based on the drawing data including the graphics drawing command after the change.

10 Claims, 12 Drawing Sheets

(52) U.S. Cl.
CPC ....... *G06F 3/1248* (2013.01); *G06K 15/1809* (2013.01); *G06K 15/1813* (2013.01)

(56) References Cited

U.S. PATENT DOCUMENTS

2008/0186517 A1* 8/2008 Silverbrook ........... G06K 15/02
                                                           358/1.8
2009/0097047 A1* 4/2009 Mitsui ................... G06F 3/1208
                                                           358/1.9

* cited by examiner

801

```
<?xml version="1.0" encoding=" utf-8"?>
<Settings>
  <Setting SearchString="microsoftxpsdocumentwriter" SearchPath=" /MetaData/*_PT.xml" Mode=" GDI" />
</Settings>
```

FIG.8A

```
<?xml version="1.0" encoding="UTF-8"?>
<psf:PrintTicket xmlns:psk="http://schemas.microsoft.com/windows/2003/08/printing/printschemakeywords" version="1 "
xmlns:xsd="http://www.w3.org/2001/XMLSchema" xmlns:xsi="http://www.w3.org/2001/XMLSchema-instance" xmlns:psf="http://
schemas.microsoft.com/windows/2003/08/printing/printschemaFramework" xmlns:ns0000="http://schemas.microsoft.com/windows/
2006/06/printing/printschemakeywords/microsoftxpsdocumentwriter" >

<psf:Feature name="psk:PageMediaSize">
  <psf:Option name="psk:ISOA4" >
    <psf:ScoredProperty name="psk:MediaSizeWidth">
      <psf:Value xsi:type="xsd:integer">210000</psf:Value>
    </psf:ScoredProperty>
    <psf:ScoredProperty name="psk:MediaSizeHeight">
      <psf:Value xsi:type="xsd:integer">297000</psf:Value>
    </psf:ScoredProperty>
  </psf:Option>
</psf:Feature>

<psf:Feature name="psk:PageResolution">
  <psf:Option name="psk:Option 1 ">
    <psf:ScoredProperty name=" psk:ResolutionX">
      <psf:Value xsi:type="xsd:integer">100</psf:Value>
    </psf:ScoredProperty>
    <psf:ScoredProperty name=" psk:ResolutionY">
      <psf:Value xsi:type="xsd:integer">100</psf:Value>
    </psf:ScoredProperty>
  </psf:Option>
</psf:Feature>

</psf:PrintTicket>
```

FIG.8B

```xml
<?xml version="1.0" encoding="UTF-8"?>
<psf:PrintTicket xmlns:psk="http://schemas.microsoft.com/windows/2003/08/printing/printschemakeywords" version="1"
xmlns:xsd="http://www.w3.org/2001/XMLSchema" xmlns:xsi="http://www.w3.org/2001/XMLSchema-instance" xmlns:psf="http://
schemas.microsoft.com/windows/2003/08/printing/printschemaFramework">

<psf:Feature name="psk:PageMediaSize">
    <psf:Option name="psk:ISOA4">
      <psf:ScoredProperty name="psk:MediaSizeWidth">
        <psf:Value xsi:type="xsd:integer">210000</psf:Value>
      </psf:ScoredProperty>
      <psf:ScoredProperty name="psk:MediaSizeHeight">
        <psf:Value xsi:type="xsd:integer">297000</psf:Value>
      </psf:ScoredProperty>
    </psf:Option>
  </psf:Feature>

<psf:Feature name="psk:PageResolution">
    <psf:Option name="psk:Option1">
      <psf:ScoredProperty name="psk:ResolutionX">
        <psf:Value xsi:type="xsd:integer">100</psf:Value>
      </psf:ScoredProperty>
      <psf:ScoredProperty name="psk:ResolutionY">
        <psf:Value xsi:type="xsd:integer">100</psf:Value>
      </psf:ScoredProperty>
    </psf:Option>
  </psf:Feature>

<psf:Feature name="psk:OutputMode">
    <psf:Option name="psk:GDI"/>
  </psf:Feature>

</psf:PrintTicket>
```

FIG.12

INFORMATION PROCESSING APPARATUS, PRINT DATA GENERATION METHOD, AND STORAGE MEDIUM

This application is a continuation of U.S. patent application Ser. No. 15/295,416 (allowed), which was filed Oct. 17, 2016, the contents of which are incorporated herein by reference.

BACKGROUND OF THE INVENTION

Field of the Invention

The present invention relates to a drawing control technique of a printer driver.

Description of the Related Art

In the printing system of Microsoft Corporation, a graphics engine called a GDI (Graphic Device Interface) has been used conventionally. A conventional print processing flow using the GDI is as follows.

1) In response to instructions to perform printing from a user, a GDI application calls a GDI service function group and issues a GDI drawing command.

2) The issued GDI drawing command is spooled in a data format called an EMF (Enhanced Metafile) and delivered to a GDI printer driver (hereinafter, called a "GDI driver").

3) The GDI driver converts drawing data including a GDI drawing command (hereinafter, called "GDI format drawing data") into print data that can be interpreted by a printing apparatus (so-called PDL data) and inputs the print data to the printing apparatus.

It is assumed that the processing flow to perform printing from the GDI application via the GDI driver as described above is called a "GDI print path". In recent years, to this GDI print path, a new print processing flow called an XPS print path has been added. The XPS is an XML based electronic document format and stands for XML Paper Specification. In the XPS print path, XPS format drawing data is generated by an application compatible with the XPS (hereinafter, called an "XPS application"), converted into print data by an XPS printer driver (hereinafter, called an "XPS driver"), and output to a printing apparatus.

The GDI print path and the XPS print path are not in an exclusive relationship and for example, it is possible to convert GDI format drawing data generated by a GDI application using the GDI into XPS format drawing data and to convert the XPS format drawing data into print data by an XPS driver. Further, conversely, it is also possible to convert XPS format drawing data by an XPS application into GDI format drawing data and to convert the GDI format drawing data into print data by a GDI driver. That is, a print processing flow to perform printing from a GDI application via an XPS driver and a print processing flow to perform printing from an XPS application via a GDI driver also exist. For example, in the case where printing is performed from a GDI application by using an XPS driver, GDI format drawing data is converted into XPS format drawing data by a conversion module. This conversion module is called MXDW (Microsoft XPS Document Writer). The drawing data converted into the XPS format is converted into print data by an XPS driver after being stored in an XPS spool file.

As described above, in the OS after Windows (registered trademark) VISTA, it is made possible to make use of the four print processing flows. Due to this, it is possible to cope with print processing of drawing data generated by both the GDI application and the XPS application by preparing at least one of the GDI driver and the XPS driver.

However, the specifications are different between the XPS format and the GDI format, and therefore, there are a variety of problems about format conversion of drawing data. As one of the examples, mention is made of a problem in that a print request in which an image to be printed is allocated to a portion that bulges out of a printable area is issued from the GDI application to the XPS driver. For this problem, there has been proposed a technique to perform control so that XPS format drawing data that is input to the XPS driver is printed within a printable area by determining whether the XPS format drawing data originates from the GDI application or the XPS application (Japanese Patent Laid-Open No. 2008-276745).

Then as the problem about the format conversion of drawing data, the presence of a problem about drawing of a graphics object has been made clear, in addition to the above-described problem. This problem is a problem in that in the case where object width=0 is specified in a graphics object drawing command, the object (e.g., line) is drawn or not depending on the printer driver. The problem results from that object width=0 in the GDI format means the minimum width that a device can display, but object width=0 in the XPS format means that the object is not at all drawn. That is, in the case where drawing data generated by a GDI application via the GDI includes a drawing command specifying drawing of a line with object width=0, the line is drawn on a condition that printing is performed by the GDI driver, but in the printing by the XPI driver, the line is not drawn. In the case where printing results considerably differ depending on the kind of printer driver that is made use of despite that the drawing command is issued from the same application and is the same, the printing quality is affected significantly.

SUMMARY OF THE INVENTION

The information processing apparatus according to the present invention is an information processing apparatus including: a conversion module configured to convert GDI format drawing data into XPS format drawing data; and a printer driver configured to generate print data compatible with a printing apparatus from input XPS format drawing data, and in the case where the input XPS format drawing data is XPS format drawing data converted by the conversion module from GDI format drawing data that is generated based on print processing of a GDI application and the XPS format drawing data includes a graphics drawing command specifying an object width of 0, the printer driver changes the graphics drawing command into a graphics drawing command specifying drawing with the minimum object width that can be represented by the printing apparatus and generates the print data based on the drawing data including the graphics drawing command after the change.

Further features of the present invention will become apparent from the following description of exemplary embodiments (with reference to the attached drawings).

BRIEF DESCRIPTION OF THE DRAWINGS

FIG. 8A is a diagram showing an example of search character string setting information and FIG. 8B is a diagram showing an example of a print ticket as a target file of a search;

FIG. 12 is an example of a print ticket according to the second embodiment.

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

First Embodiment

Figure 1:
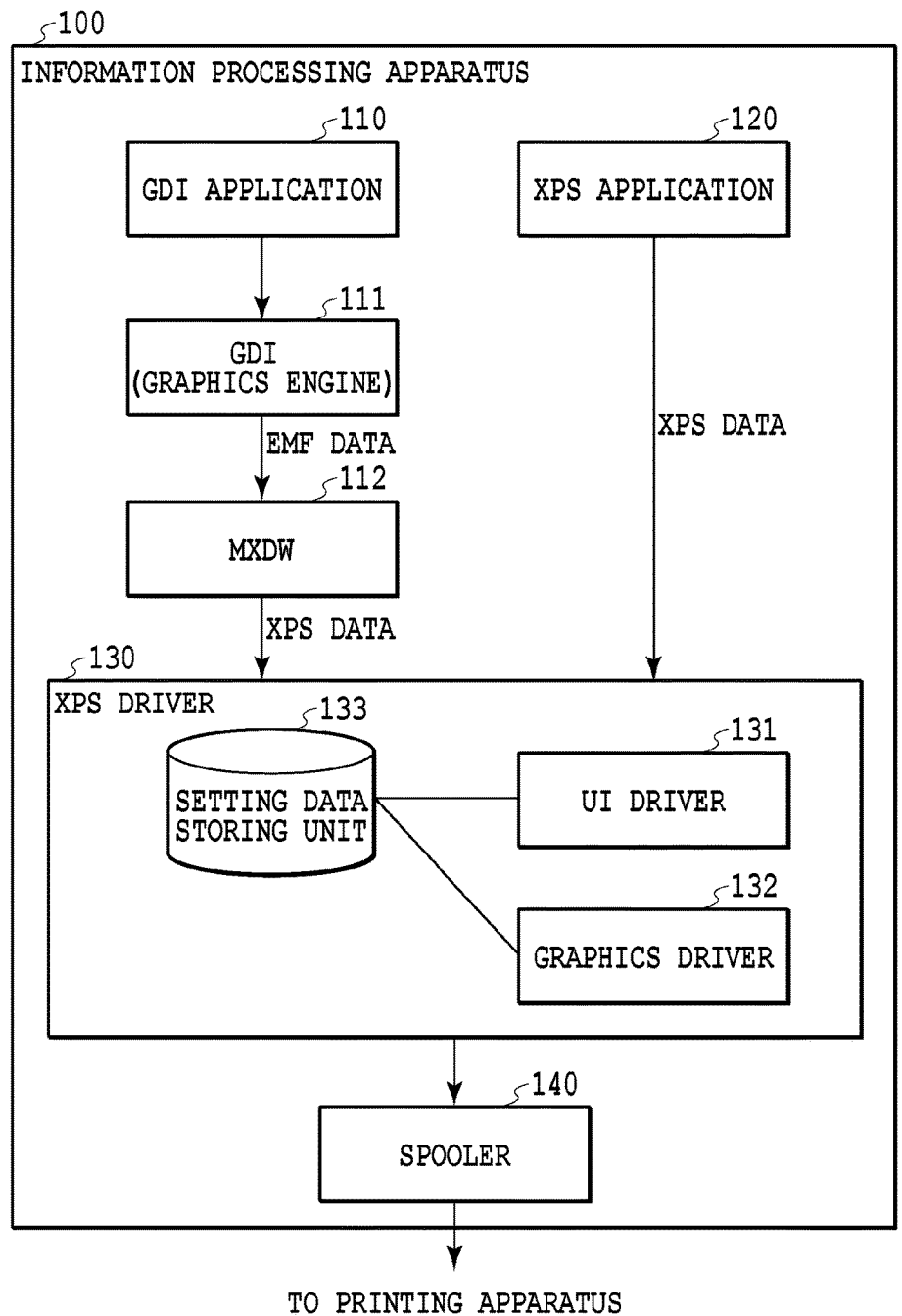
FIG. 1 is a function block diagram showing an example of a configuration of an information processing apparatus that generates print data.

FIG. 1 is a function block diagram showing an example of a configuration of an information processing apparatus that generates print data according to the present embodiment. On an information processing apparatus 100, an operating system (hereinafter, OS), not shown, is installed. In the present embodiment, as the OS, Windows (registered trademark) is supposed. Then, in the information processing apparatus 100, as software for generating drawing data, two kinds of drawing software, i.e., a GDI application 110 and an XPS application 120 run on the OS. The GDI application 110 calls a GDI function upon receipt of printing instructions from a user and generates GDI format drawing data in accordance with the attribute (text, graphics, image, etc.) of an object by using a GDI 111. In general, the GDI 111 is called a graphics engine. The input of GDI format drawing data is not received by an XPS driver 130 as it is, and therefore, the GDI format drawing data is sent to an MXDW 112. The MXDW 112 is a GDI-XPS conversion unit, a module configured to convert GDI format drawing data into XPS format drawing data, and is provided by the OS. The drawing data converted into the XPS format by the MXDW 112 is input to the XPS driver 130. The XPS application 120 directly generates XPS format drawing data. There is a case where XPS format drawing data is generated via a graphics engine called WPF (Windows Presentation Foundation), but this case does not relate to the feature of the present invention, and therefore, explanation is omitted. The XPS format drawing data generated by the XPS application 120 is input to the XPS driver 130 as it is.

The XPS driver 130 is a printer driver that receives only XPS format drawing data as input drawing data. The XPS driver 130 manages print settings, such as the number of print copies and the sheet size, and generates print data (PDL data) that can be interpreted by a printing apparatus from the input drawing data. The print data generated by the XPS driver 130 is transmitted to the printing apparatus via a spooler 140. The XPS driver 130 includes a UI driver 131, a graphics driver 132, and a setting data storing unit 133. The UI driver 131 displays a user interface screen (hereinafter, UI screen) of the XPS driver 130 and saves information about the print settings input from a user. The graphics driver 132 generates print data from the XPS format drawing data based on the print setting information set by a user in the UI driver 131. Details of the UI driver 131 and the graphics driver 132 will be described later. The setting data storing unit 133 stores various kinds of setting data relating to printing that is referred to by the XPS driver 130 at the time of generation of print data. This setting data is described in the XML format and includes information about operation settings of the UI driver 131 and the graphics driver 132. In the present embodiment, information about a search character string for determining the kind of application is held as part of the setting data and the information is referred to at the time of generation of print data.

Figure 2:
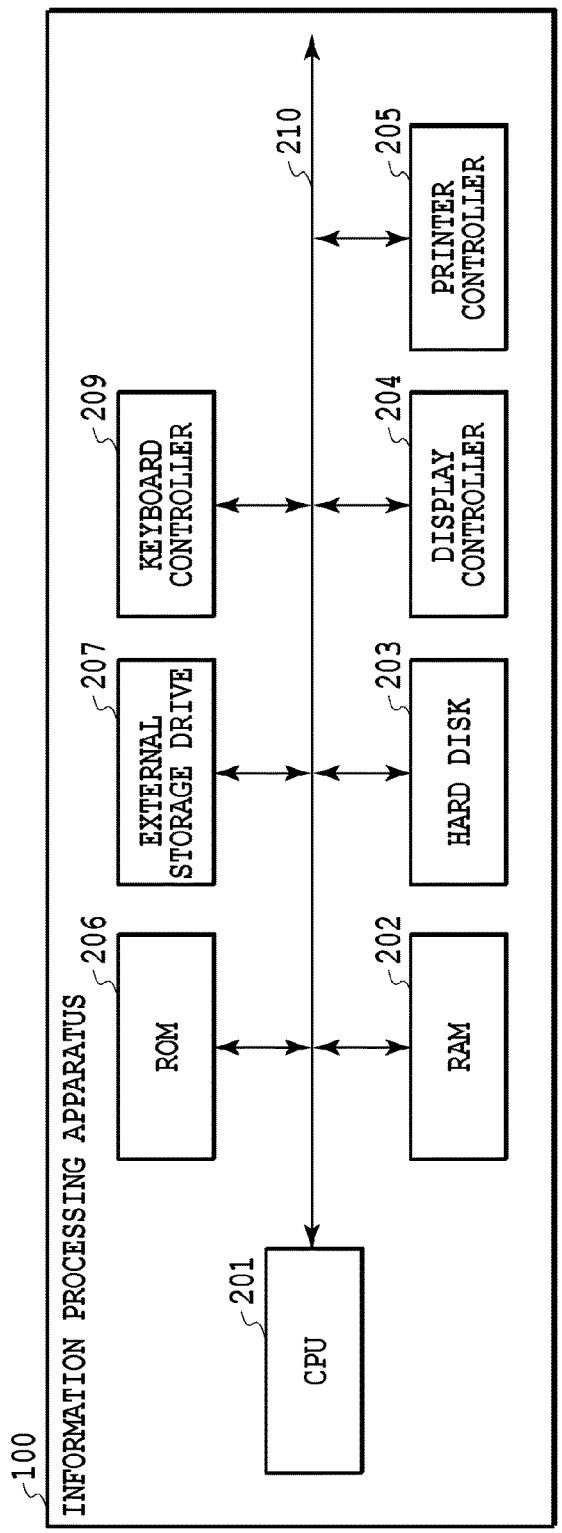
FIG. 2 is a block diagram showing an example of a hardware configuration of the information processing apparatus.

FIG. 2 is a block diagram showing an example of a hardware configuration of the information processing apparatus 100. The configuration shown in FIG. 2 is an example and the information processing apparatus 100 may be a standalone apparatus or a system including a plurality of apparatuses connected via a network, such as a LAN and a WAN. The information processing apparatus 100 implements various kinds of processing by a CPU 201 executing processing programs stored in a ROM 206 or a hard disk 203 and centralizedly controls each unit connected to a system bus 210. Further, the CPU 201 performs various kinds of processing, such as processing to open a window registered in advance, based on a command specified by a mouse cursor or the like. For example, in the case where a user gives instructions to perform printing, the CPU 201 opens the window of print settings and performs various settings for the XPS driver 130. A RAM 202 functions as a main memory, a work area, etc., of the CPU 201. In the hard disk 203, an OS, a boot program, various applications, font data, user files, edited files, etc., are stored. The XPS driver 130 is also saved in the hard disk 203. A display controller 204 controls the display of a display, not shown. A printer controller 205 is connected to a printing apparatus via a predetermined bidirectional interface (not shown) and is in charge of controlling communication with the printing apparatus. The CPU 201 performs, for example, processing to develop (rasterize) outline fonts of display information onto the RAM set on the RAM 202 and enables WYSIWYG on the display. An external storage drive 207 controls access to a storage medium, such as CD and DVD. A keyboard controller 209 controls the key input from a keyboard and a pointing device.

Figure 3:
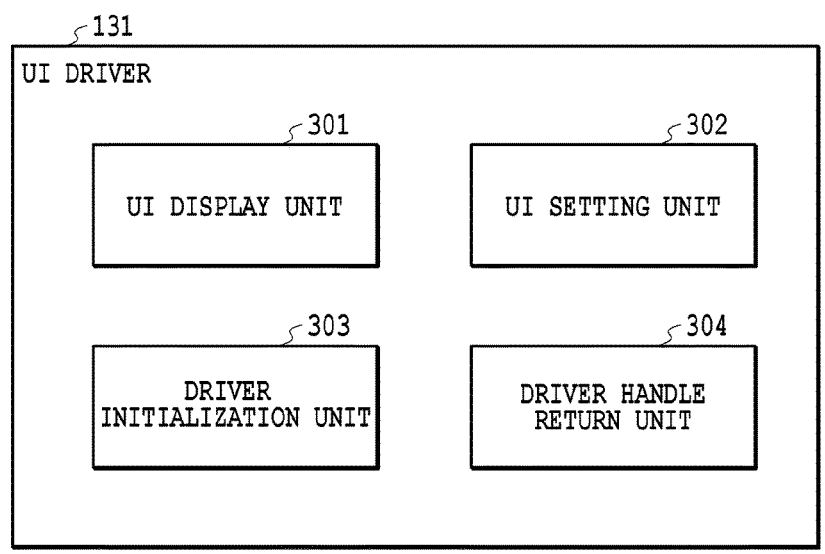
FIG. 3 is a diagram showing an example of an internal configuration of a UI driver.

Subsequently, details of the UI driver 131 are explained. FIG. 3 is a diagram showing an example of an internal configuration of the UI driver 131. The UI driver 131 includes a UI display unit 301, a UI setting unit 302, a driver initialization unit 303, and a driver handle return unit 304.

The UI display unit 301 displays a UI screen for a user to perform print settings on the display. The UI setting unit 302 saves the print setting set or changed by a user via the UI display unit 301. The driver initialization unit 303 initializes the UI driver 131. Upon receipt of instructions to initialize the driver from an application or the GDI 111, the driver initialization unit 303 delivers a driver handle generated in the initialization processing to the application or the GDI 111. The driver handle is an identification name for uniquely identifying a driver. The driver handle generated in the initialization processing is returned to the application having given the initialization instructions by the driver handle return unit 304. The application having received the driver handle permits the print setting input for a user and outputs drawing data to the XPS driver 130. There is a case where instructions to display a UI screen are delivered to the UI driver 131 along with the instructions to initialize the driver for a user to perform print settings. In this case, a UI dialog is displayed on the UI display unit 301.

Figure 4:
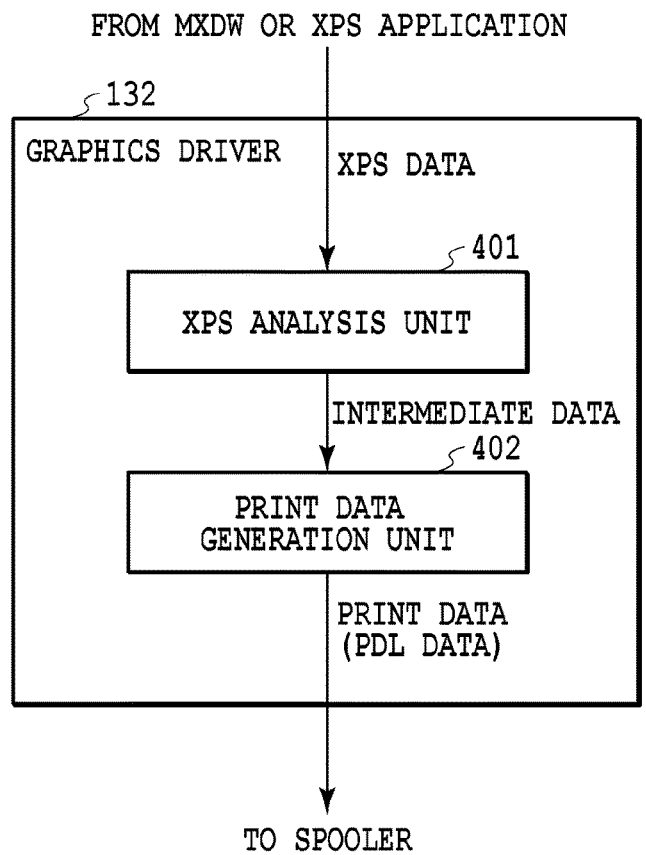
FIG. 4 is a diagram showing an example of an internal configuration of a graphics driver.

Subsequently, details of the graphics driver 132 are explained. FIG. 4 is a diagram showing an example of an internal configuration of the graphics driver 132. As described previously, the graphics driver 132 has a function to receive XPS format drawing data (hereinafter, called "XPS data"), generate print data in accordance with print setting information, and transmit the print data to a printing apparatus via the spooler 140. The graphics driver 132 includes an XPS analysis unit 401 and a print data generation unit 402.

In the XPS data input from the MXDW 112 or the XPS application 120, all the document information is described in the XML and a plurality of files for each of description contents is integrated into one file by ZIP compression. The input XPS data is analyzed after being decompressed in the XPS analysis unit 401. The contents of analysis include, for example, processing to determine whether the input XPS data originates from the GDI application 110. Details of the analysis processing will be described later. Further, the XPS analysis unit 401 also generates intermediate data, which is data in the previous stage of print data. The print data generation unit 402 generates print data (PDL data) based on the intermediate data and the pint setting information. The generated print data is output to the spooler 140.

Figure 5:
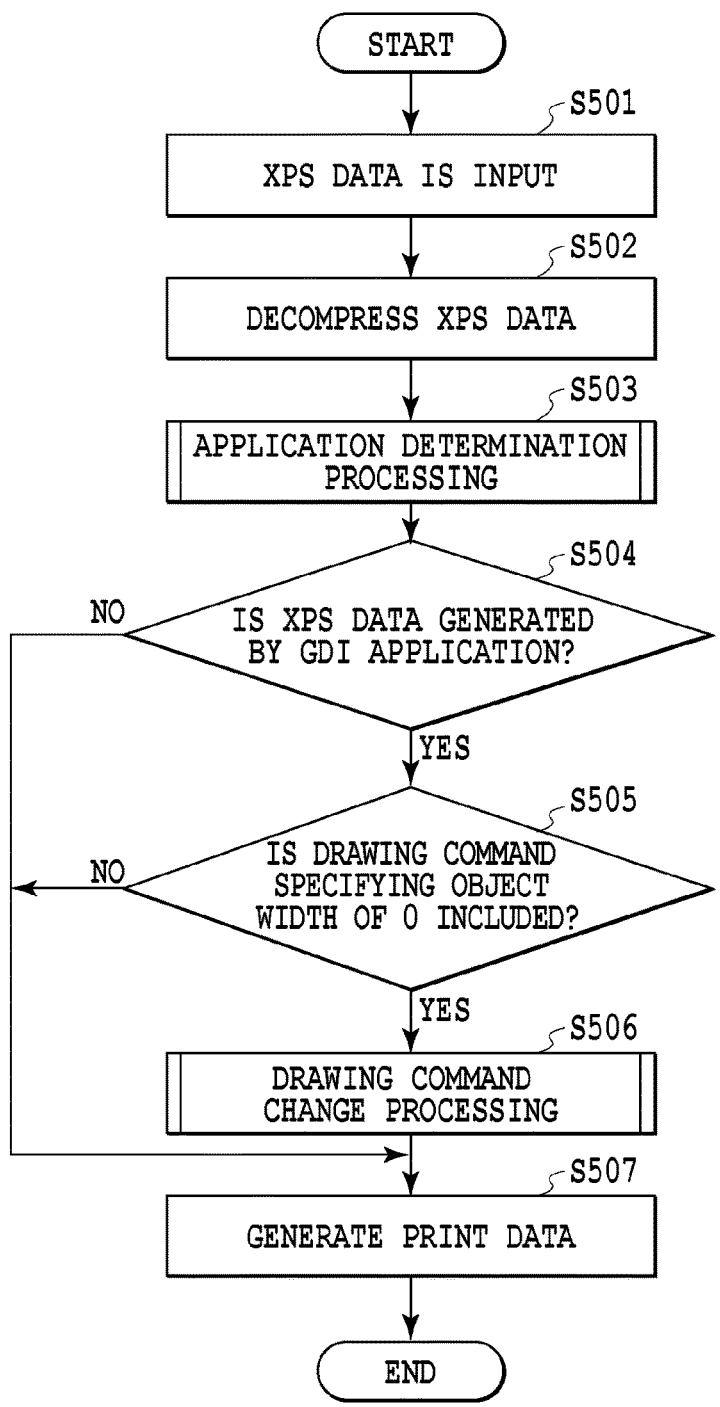
FIG. 5 is a flowchart showing a flow of print data generation processing.

Next, print data generation processing in the XPS driver 130 according to the present embodiment is explained in detail. FIG. 5 is a flowchart showing a flow of print data generation processing. The print data generation processing starts in response to printing instructions to the XPS driver 130. Specifically, the print data generation processing is implemented by a predetermined program stored in the ROM 206 being developed onto the RAM 202 and executed by the CPU 201 in response to the printing instructions of a user.

At step 501, to the XPS driver 130, XPS data is input from the MXDW 112 or the XPS application 120. The input XPS data is sent to the XPS analysis unit 401 within the graphics driver 132. At this point in time, the XPS data is in the state of being in the ZIP format. At the point in time of reception of input of the XPS data by the XPS driver 130, whether the XPS data is input directly from the XPS application 120 or the XPS data is originally GDI format drawing data and input after being converted into the XPS format by the MXDW 112 is not known. Because of this, application determination processing, to be described later, is performed at step 503 in order to identify whether the input XPS data originates from the GDI application 110 or from the XPS application 120.

Figure 6:
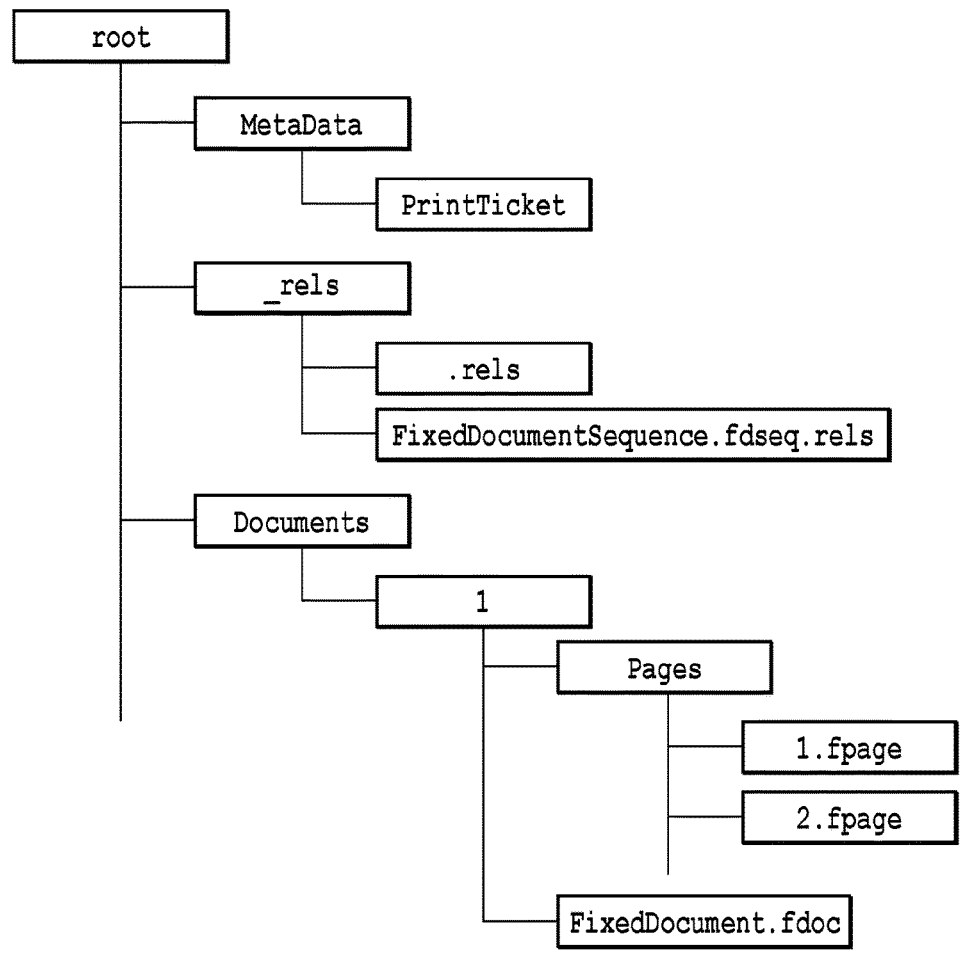
FIG. 6 is a diagram showing a data structure of XPS data.

At step 502, the XPS analysis unit 401 decompresses the XPS data in the ZIP format. FIG. 6 is a diagram showing a data structure of XPS data. The XPS data has a tree structure and in the first hierarchy under the root folder, a plurality of folders exists, such as "Metadata", "_rels", and "Documents".

At step 503, the XPS analysis unit 401 performs application determination processing. The application determination processing is processing to determine whether a source application of the input XPS data is the GDI application 110 or the XPS application 120. Details of the application determination processing will be described later. In the case where the results of the determination indicate that the source application of the input XPS data is the GDI application 110, the processing proceeds to step 505. On the other hand, in the case where the source application of the input XPS data is the XPS application 120, intermediate data is generated without performing anything for the drawing command and the processing proceeds to step 507.

At step 505, the XPS analysis unit 401 determines whether there exists a drawing command in which 0 is specified as the width of an object of a graphics attribute within a file for each page within the "Documents" folder obtained by decompression. Here, "1.fpage" or "2.fpage" shown in FIG. 6 is the file for each page and in which, for example, a drawing command of "Path" shown below is included.

<Path Data="F1 M 19.2, 19.2 L 96, 19.2" Stroke="#ffff0000" StrokeThickness="0" StrokeLineJoin="Round" StrokeStartLineCap="Round" StrokeEndLineCap="Round" Clip="M 0, 0 L 0, 1083.84 755.2, 1083.84 755.2, 0 z"/>

The above-described "Path" is a command specifying drawing of a line and each element represents setting contents of line drawing. For example, the Data element represents moving (M) to coordinates of (19.2, 19.2) and drawing a line (L) for (96, 19.2). Then, the element relating to the line width as an object width is "StrokeThickness", which means that the element value is "0", i.e., a line is not drawn according to the XPS specifications.

In the case where the results of the determination indicate that a graphics drawing command specifying an object width of 0 exists, the processing proceeds to step 506. On the other hand, in the case where a graphics drawing command specifying an object width of 0 does not exist, intermediate data is generated without performing anything for the drawing command within the file and the processing proceeds to step 507.

At step 506, the XPS analysis unit 401 performs processing to change the graphics drawing command specifying an object width of 0 into a graphics drawing command specifying drawing of an object (e.g., line object) with the minimum width. For example, in the case of the above-described drawing command "Path", the drawing command is changed as follows.

<Path Data="F1 M 19.2, 19.2 L 96, 19.2" Stroke="#ffff0000" StrokeThickness="0.16" StrokeLineJoin="Round" StrokeStartLineCap="Round" StrokeEndLineCap="Round" Clip="M 0, 0 L 0, 1083.84 755.2, 1083.84 755.2, 0 z"/>

In the case of the above-described specific example, the element value "0" of "StrokeThickness" is changed to "0.16" and this means that a line is drawn with a width of 0.16 (in units of points). As described above, instead of interpreting the graphics drawing command specifying an object width of 0 as not drawing a line by faithfully following the XPS specifications, by reinterpreting the graphics drawing command as contents to draw a line in the minimum unit of the device in accordance with the GDI specifications, the contents of the drawing command are changed. A specific flow of the drawing command change processing will be described later. Then, intermediate data is generated in accordance with the results of the drawing command change processing or in the process of the drawing command change processing, and the intermediate data is sent to the print data generation unit 402.

At step 507, the print data generation unit 402 generates print data based on the intermediate data and the print setting information. The generated print data is sent to the spooler.

The above is the contents of the print data generation processing in the XPS driver 130. As described above, it is made possible to perform printing with the specifications supposed by each application by generating print data in accordance with the kind of the source application as to the graphics drawing specifying object width=0, the specifications of which are different between the GDI and the XPS.

Figure 7:
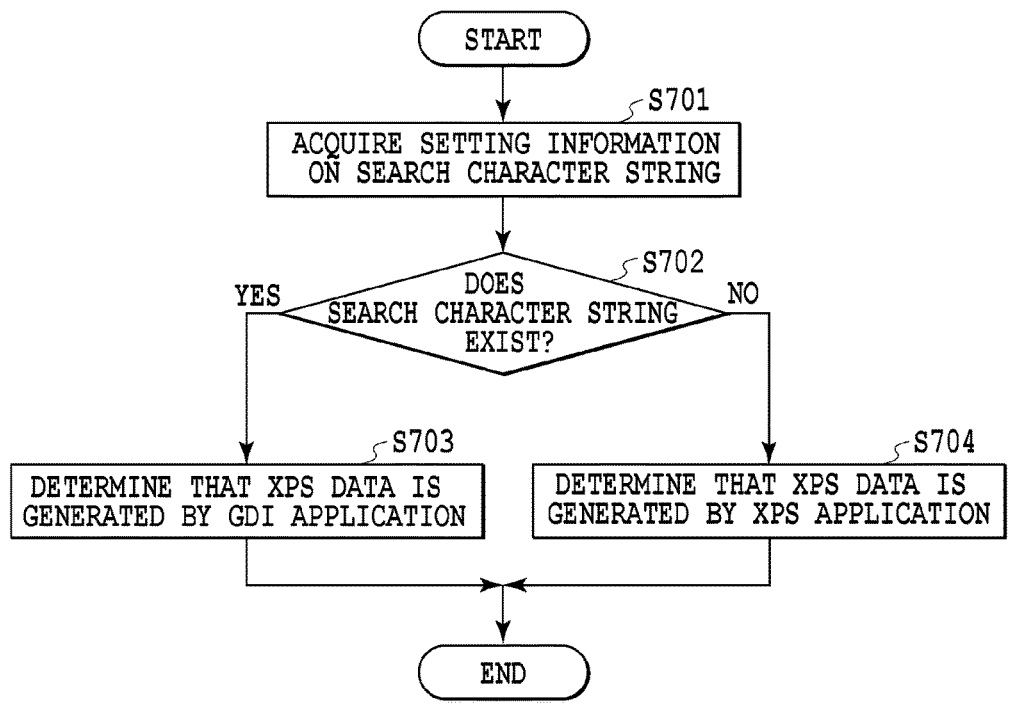
FIG. 7 is a flowchart showing details of application determination processing according to a first embodiment.

Subsequently, details of the application determination processing (step 503) in the flowchart in FIG. 5 described above are explained. In the application determination processing of the present embodiment, by searching for a specific character string from a predetermined file within the XPS format drawing data in accordance with information on the search condition set in advance, the source application of the XPS data input to the XPS driver is specified. FIG. 7 is a flowchart showing details of the application determination processing according to the present embodiment.

At step 701, setting information about the search character string for specifying the source application is acquired from the setting data storing unit 133. FIG. 8A shows an example of the search character string setting information to be acquired at this step and which character string is searched for with which portion (file) within the XPS data as a target is specified. In the search character string setting information shown in FIG. 8A, a Setting element 801, which is the unit of the search condition, further has three elements: "SearchString", "SearchPath", and "Mode". "SearchString" is an element that specifies a character string to be searched for and here, is a character string representing the MXDW 112. As its value, "microsoftxpsdocumentwriter" is set. This character string representing the MXDW 112 is to be described in the print ticket at a job level in the MXDW 112 at the time of conversion from the GDI format into the XPS format. Because of this, it is possible to determine that the XPS data having the print ticket including this character string is generated by the GDI application 110. The character string is not limited to "microsoftxpsdocumentwriter" because the character string is only required to represent the MXDW 112.

"SearchPath" is an element that specifies a path for specifying from which file of the XPS data, the character string is searched for. Here, as its value, "/Meta Data/*_PT.xml" is set. As described previously, the XPS data is the data format in which a plurality of files is ZIP-compressed, and therefore, by specifying the path of the search destination by "SearchPath", which file is searched is specified. As in the present embodiment, by using the regular representation, it is possible to set a plurality of files (e.g., files with a file name, such as "A_PT.xml" and "B_PT.xml") as search targets. The file name of the print ticket at the job level is "JOB_PT.xml", and therefore, it may also be possible to set the character string "JOB_PT.xml" as a setting value without using a regular representation. "Mode" is an element that specifies which kind of application the XPS data originates from in the case where there exists a character string specified by "SearchString" within the file corresponding to the path specified by "SearchPath". Here, as its value, "cpk:GDI" is set. That is, in this case, it is determined that the XPS data originates from the GDI application 110 on a condition that the character string "microsoftxpsdocumentwriter" exists within the file including "_PT.xml" within the metadata folder as a file name. In the case where "cpk:XPS" is included as the setting value of the "Mode" element, it is determined that the XPS data originates from the XPS application 120. In the example in FIG. 8A, only one search condition (only one Setting element) is set, but it may also be possible to set a plurality of search conditions and to specify the kind of application in the case where any of the search conditions (Setting elements) is satisfied. In this manner, the setting information defines the contents that from which file of the XPS data, which character string is searched for, and which kind of application is determined in the case where the character string is found. Due to this, it is possible to change the search condition by changing the definition in the setting information with the program itself remaining unchanged.

At step 702, whether the search character string specified by "SearchString" exists within the file indicated by the path specified by "SearchPath" in accordance with the setting information on the search character string. FIG. 8B is a diagram showing an example of the print ticket as a target file of search. In the example shown in FIG. 8B, in the "xmlns:ns0000" element of the "psf:PrintTicket" element, the above-described character string "microsoftxpsdocumentwriter" is included. In the case where the results of the determination indicate that the search character string exists within the target file, the processing proceeds to step 703. On the other hand, in the case where the search character string does not exist within the target file, the processing proceeds to step 704.

At step 703, it is determined that the input XPS data is generated by the GDI application 110 via the MXDW 112 and the present processing is terminated.

At step 704, it is determined that the input XPS data is generated by the XPS application 120 and the present processing is terminated.

The above is the contents of the application determination processing according to the present embodiment.

Figure 9:
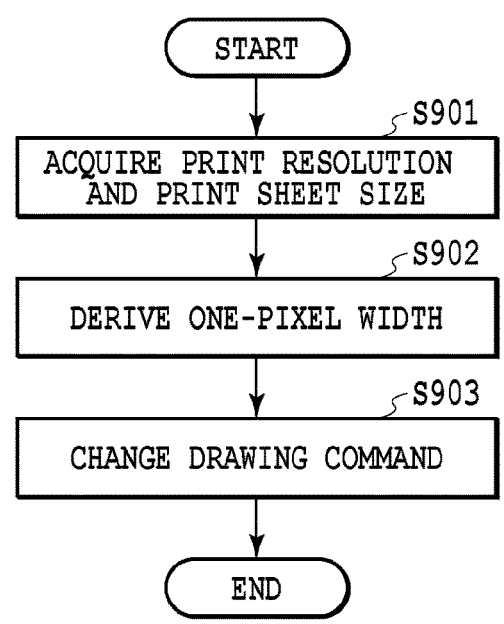
FIG. 9 is a flowchart showing details of drawing command change processing.

Subsequently, details of the drawing command change processing (step 506) in the flowchart in FIG. 5 described above are explained. FIG. 9 is a flowchart showing details of the drawing command change processing.

At step 901, from the print setting information set by a user, information on the print resolution and the print sheet size is acquired. The print setting information is described in the portion called the print ticket described above within the XPS data. The XPS analysis unit 401 analyzes the print ticket and acquires the information on the print resolution and the print sheet size. In the example in FIG. 8B, 100 (dpi) is set to the print resolution by the "psk:PageResolution" element and the size (210 mm in the vertical direction×297 mm in the horizontal direction) corresponding to the A4 size is set to the print sheet size by the "psk:PageMediaSize", respectively.

At step 902, from the acquired information on the print resolution and the print sheet size, the width of one pixel (pixel) is derived, which is the minimum width that can be represented by the device. For example, in the case where the print resolution is set to 100 (dpi) and the print sheet size is set to A4 as described above, the number of pixels of the image is 827 pixels in the vertical direction×1,169 pixels in the horizontal direction. In this case, as the width of one pixel, about 0.25 mm is derived.

At step 903, the graphics drawing command specifying object width=0 (meaning "nothing is drawn" in the XPS format) is changed into a graphics drawing command specifying drawing of an object with an object width (here, 0.25 mm) corresponding to the one-pixel width.

The above is the contents of the drawing command change processing. Due to this change processing, in the case where the input XPS data is generated by the GDI application, the drawing command the contents of which are that nothing is drawn is changed into a drawing command specifying drawing with the minimum object width as in the GDI specifications.

In the above-described example, the one-pixel width is found by calculation, but depending on the printing apparatus or the specifications of print data to be generated, there is a case where a dedicated drawing command specifying drawing of an object of graphics attribute, such as a line, with the minimum width is prepared in advance. In the case such as this, it may also be possible to omit the derivation processing at step 902 described above and to generate print data after changing the graphics drawing command specifying an object width of 0 into the above-described dedicated drawing command at the time of generation of print data (step 507) in the flow in FIG. 5. In this case, the object width is calculated on the printing apparatus side.

Further, in the present embodiment, the printer driver installed on the information processing apparatus includes only the XPS driver, but the GDI driver may be further installed. By applying the present embodiment, it is possible to obtain the same printing results even in the case where any one of the printer drivers is used for drawing data generated by a GDI application.

According to the present embodiment, in the case where XPS data input to the XPS driver originates from a GDI application, the drawing command specifying object width=0 is changed into a graphics drawing command specifying drawing of an object with the minimum width in accordance with the GDI application specifications. Due to this, it is possible to obtain the printing results of the contents intended by a user using a GDI application by printing via the XPS driver.

Second Embodiment

The first embodiment is the aspect in which the source application of the XPS data input to the XPS driver is specified by searching for a specific character string from a predetermined file within the XPS data in accordance with information on the search condition set in advance and the drawing command is changed in accordance with the necessity. Next, an aspect is explained as a second embodiment, in which the source application of the XPS data is specified based on the contents of the setting performed by a user on a user interface screen of the XPS driver used at the time of printing. The basic configurations are common to the first embodiment and in the following, application determination processing is explained mainly, which is a different point from the first embodiment.

Figure 10:
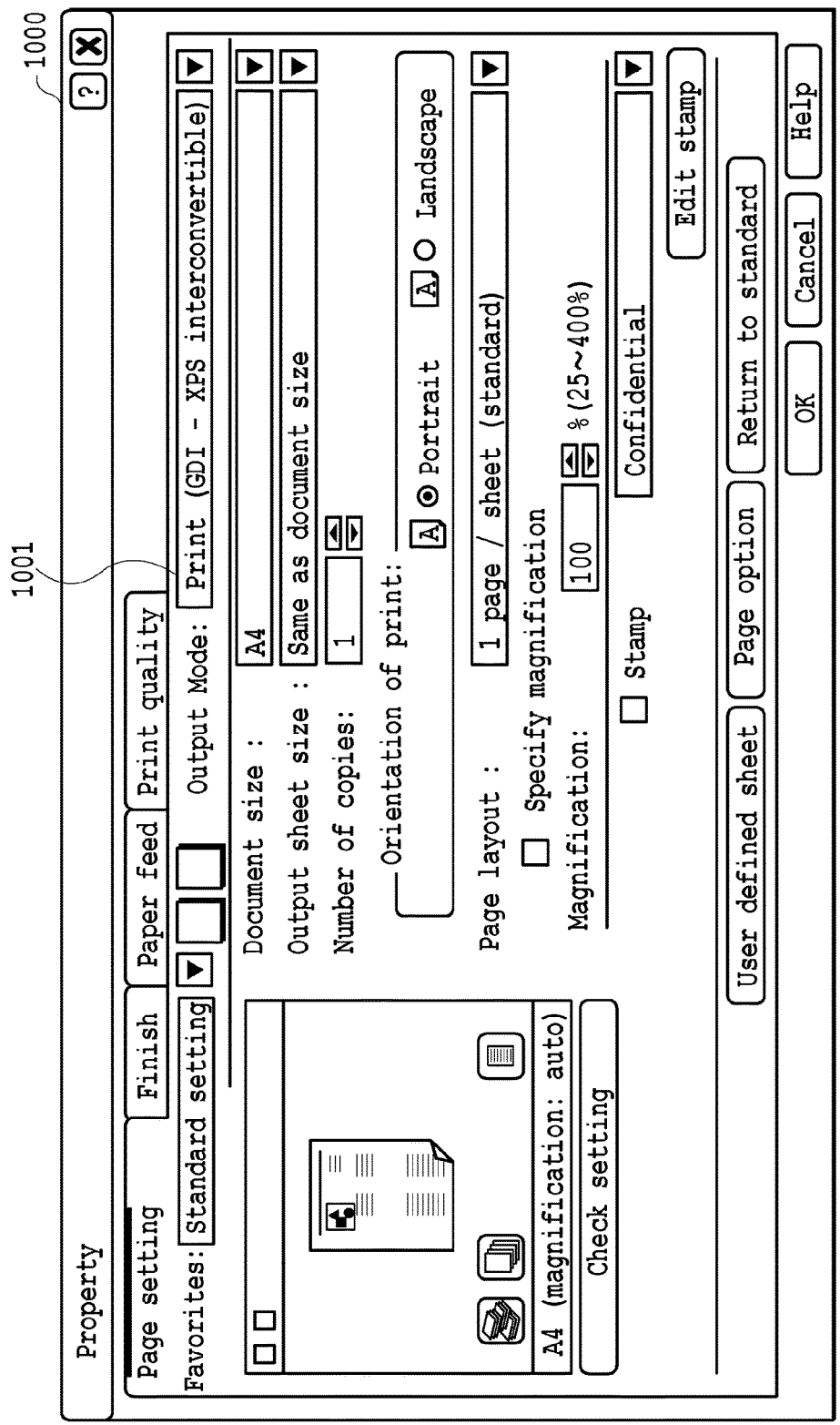
FIG. 10 is a diagram showing an example of a UI screen of an XPS driver.

First, a user interface screen (hereinafter, UI screen) of the XPS driver 130 is explained, which is used by a user at the time of printing. FIG. 10 is a diagram showing an example of a UI screen of the XPS driver 130. A UI screen 1000 is displayed on the display of the information processing apparatus 100 by the UI display unit 301 of the UI driver 131. At the time of printing, a user performs various print settings, such as the output sheet size and the orientation of print, by using the UI screen 1000 as shown in FIG. 10 from a creation application of a document or the like. On the UI screen 1000, it is possible to select "Print (GDI-XPS interconvertible)" as an output mode in an item 1001 of "Output mode" located at the top-right. "Print (GDI-XPS interconvertible)" is a mode that is selected in the case where a user who prints and outputs drawing data generated by a GDI application desires to obtain the same printing results as those at the time of printing by the GDI driver by printing via the XPS driver. In the case where a user does not select "Print (GDI-XPS interconvertible)" (for example, in the case where a user selects "Print (normal)" indicating the normal printing), everything follows the XPS specifications. That is, even in the case of drawing data generated by a GDI application, the graphics drawing command specifying object width=0 is treated as a drawing command specifying no drawing of an object in accordance with the XPS specifications.

Figure 11:
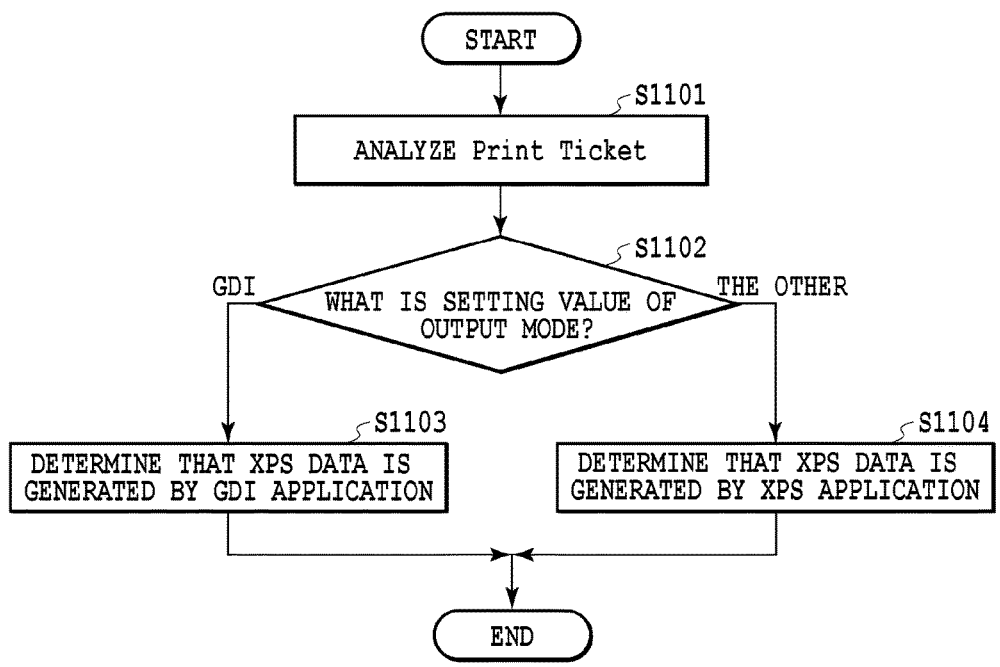
FIG. 11 is a flowchart showing details of application determination processing according to a second embodiment.

FIG. 11 is a flowchart showing details of the application determination processing according to the present embodiment.

At step 1201, from the received XPS data, the print ticket is acquired, which is a file in which print setting information is described, and the contents are analyzed. At this time, the setting value of the output mode is acquired, which is selected by a user in the item 1001 on the UI screen 1000 described above at the time of print setting. FIG. 12 is an example of a print ticket of the XPS data according to the present embodiment. Here, the item 1001 of Output mode on the UI screen 1000 is described by "psk:OutputMode" on the print ticket of the XPS data. In the example in FIG. 12, "GDI" is set as the element value of "psk:OutputMode" and this means that "Print (GDI-XPS interconvertible)" is selected as Output mode. It is made possible for the XPS analysis unit 401 to specify the kind of the source application of the XPS data by reading the setting value of the "psk:OutputMode" element on the print ticket.

At step 1102, whether the acquired setting value of the output mode (element value of "psk:OutputMode") is "GDI" is determined. In the case where the results of the determination indicate "GDI", the processing proceeds to step 1103. On the other hand, in the case where the setting value is not "GDI", the processing proceeds to step 1104.

At step 1103, it is determined that the input XPS data is the XPS data generated by the GDI application 110 via the MXDW 112 and the present processing is terminated.

At step 1104, it is determined that the input XPS data is the XPS data generated by the XPS application 120 and the present processing is terminated.

The above is the contents of the application determination processing according to the present embodiment.

By the present embodiment also, it is possible to obtain the printing results of the contents intended by a user in the GDI application by printing via the XPS driver as in the first embodiment.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment (s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment (s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, at the time of generating print data including a graphics drawing command specifying object width=0 by the XPS driver, in the case where the drawing command originates from a GDI application, the drawing command is changed into a drawing command specifying drawing with the minimum width in the device. Due to this, it is possible to prevent the occurrence of a difference in printing results depending on a printer driver to be used despite that the drawing command originates from the GDI application and is the same.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-209846, filed Oct. 26, 2015, which is hereby incorporated by reference wherein in its entirety.

What is claimed is:

1. An information processing apparatus comprising:
a memory for storing a printer driver; and
at least one processor for executing the printer driver to perform:
determining whether input XPS format drawing data is XPS format drawing data converted by a conversion module from GDI format drawing data that is generated based on print processing of a GDI application;
determining whether the input XPS format drawing data includes a predetermined graphics drawing command;
changing the predetermined graphics drawing command into a graphics drawing command that can be represented by a printing apparatus in a case where it is determined that the input XPS format drawing data is XPS format drawing data converted by the conversion module from GDI format drawing data and it is determined that the input XPS format drawing data includes the predetermined graphics drawing command; and
generating print data based on the drawing data including the graphics drawing command to which the change is applied.

2. The information processing apparatus according to claim 1, wherein
the determining whether the input XPS format drawing data is XPS format drawing data converted by the conversion module is performed by searching for a specific character string from a predetermined file within the input XPS format drawing data in accordance with search condition information set in advance.

3. The information processing apparatus according to claim 1, wherein
the determining whether the input XPS format drawing data is XPS format drawing data converted by the conversion module is performed based on contents of settings relating to an output mode instructed by a user on a user interface screen of the printer driver.

4. The information processing apparatus according to claim 1, wherein the predetermined graphics drawing command is a graphics drawing command specifying an object width of 0.

5. The information processing apparatus according to claim 4, wherein
the at least one processor executes the printer driver to further perform deriving a minimum object width by acquiring information on a print resolution and a print sheet size from a print ticket within the input XPS format drawing data, and wherein
the changing is performed by changing the graphics drawing command specifying the object width of 0 into a graphics drawing command specifying drawing with the derived object width.

6. The information processing apparatus according to claim 4, wherein
the changing is performed by changing the graphics drawing command specifying the object width of 0 into a predetermined dedicated graphics drawing command specifying drawing with the minimum object width that can be represented by the printing apparatus.

7. The information processing apparatus according to claim 4, wherein
the graphics drawing command specifying the object width of 0 is a line object graphics drawing command.

8. The information processing apparatus according to claim 1, wherein
if the input XPS format drawing data is XPS format drawing data that is generated based on print processing of an XPS application, the changing is not performed.

9. A print data generation method performed by a computer including at least one processor that executes a printer driver for generating print data from input XPS format drawing data, the print data generation method comprises:
a first determination step of determining whether the input XPS format drawing data is XPS format drawing data converted by a conversion module from GDI format drawing data that is generated based on print processing of a GDI application;
a second determination step of determining whether the input XPS format drawing data includes a predetermined graphics drawing command;
a changing step of changing the predetermined graphics drawing command into a graphics drawing command that can be represented by a printing apparatus in a case where it is determined in the first determination step that the input XPS format drawing data is XPS format drawing data converted by the conversion module from GDI format drawing data and it is determined in the second determination step that the input XPS format drawing data includes the predetermined graphics drawing command; and
a generation step of generating the print data based on the drawing data including the graphics drawing command to which the change is applied.

10. A non-transitory computer readable storage medium storing a printer driver for causing a computer to perform:
determining whether input XPS format drawing data is XPS format drawing data converted by a conversion module from GDI format drawing data that is generated based on print processing of a GDI application;
determining whether the input XPS format drawing data includes a predetermined graphics drawing command;
changing the predetermined graphics drawing command into a graphics drawing command that can be represented by a printing apparatus in a case where it is determined that the input XPS format drawing data is XPS format drawing data converted by the conversion module from GDI format drawing data and it is determined that the input XPS format drawing data includes the predetermined graphics drawing command; and generating print data based on the drawing data including the graphics drawing command to which the change is applied.

\* \* \* \* \*